Aug. 25, 1925.
E. C. BALLMAN
ALTERNATING CURRENT MOTOR
Filed Jan. 19, 1920
1,551,361
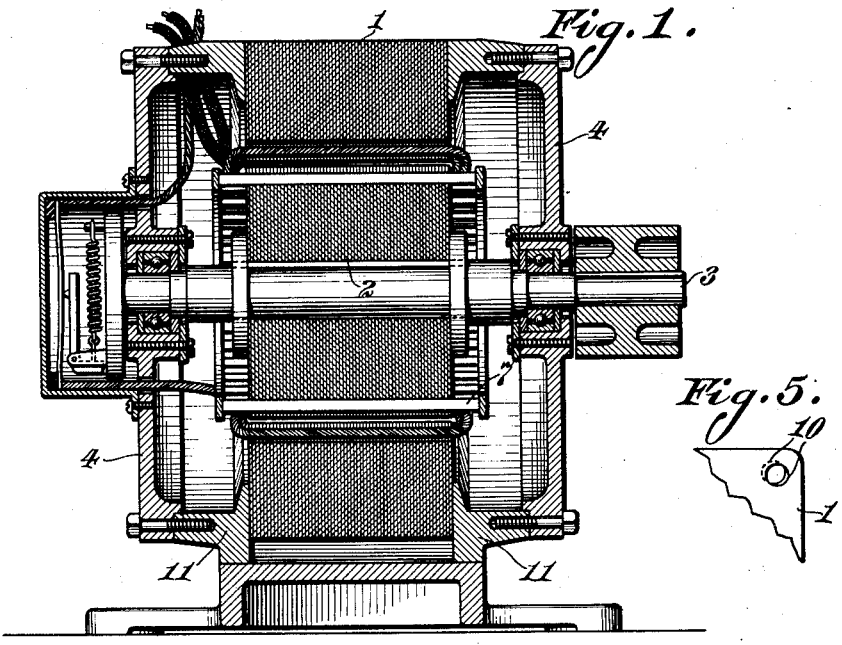
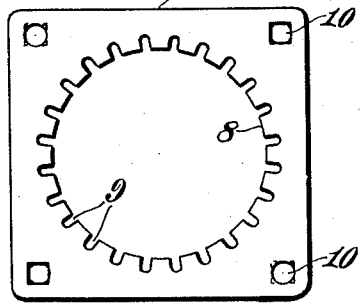
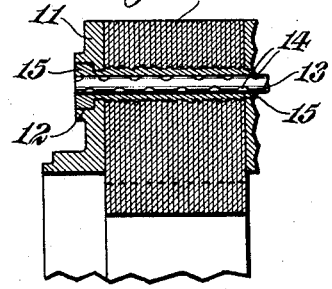
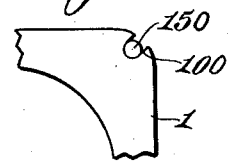
Inventor:
EDWIN C. BALLMAN,
By John N. Bruninga,
His Attorney.

Patented Aug. 25, 1925.

1,551,361

UNITED STATES PATENT OFFICE.

EDWIN C. BALLMAN, OF ST. LOUIS, MISSOURI, ASSIGNOR TO BALDOR ELECTRIC COMPANY, OF ST. LOUIS, MISSOURI, A CORPORATION OF MISSOURI.

ALTERNATING-CURRENT MOTOR.

Application filed January 19, 1920. Serial No. 352,593.

*To all whom it may concern:*

Be it known that I, EDWIN C. BALLMAN, a citizen of the United States, and residing at St. Louis, Missouri, have invented the new and useful Improvement in Alternating-Current Motors, of which the following is a specification.

This invention relates to dynamo electric machines, and more particularly to those of the alternating current type having a laminated magnetic core, and has special reference to alternating current motors.

In the usual construction of the alternating current machines, the magnetic cores are made up of a plurality of sheet iron punchings assembled together. The support of these punchings usually takes the form of a casting, which is bored or otherwise machined to form a seat for the punchings. These castings are necessarily heavy and usually have more or less bulky fastening contrivances to hold them in place.

One of the objects of this invention, therefore, is to provide improved means for holding the core punchings in assembled relation.

Another object of this invention is to provide an improved method for applying such holding means to the core punchings.

Further objects will appear from the detail description taken in connection with the accompanying drawing in which:

Figure 1 is a sectional view of a machine embodying this invention;

Figure 2 is a view illustrating the stator punchings;

Figure 3 is a sectional view showing the method of fastening the punchings;

Figure 4 is a fragmentary view showing another embodiment of the method of fastening the punchings;

Figure 5 is a fragmentary view showing punchings with holes out of alinement;

The embodiment of this invention selected for illustration is a split-phase alternating current motor.

Referring now to the accompanying drawings, 1 represents the stator punchings of a motor embodying this invention, 2 the rotor punchings assembled on the shaft 3 which is mounted to rotate in bearings in the end plates 4.

The punchings 1 are generally rectangular in shape having a central bore 8 and the usual slots 9. In the corner of the rectangle holes 10 are provided for the accommodation of the fastening device. These holes may be placed somewhat out of alinement with one another in different punchings, or they may be of different shapes in different punchings. This can be accomplished, for instance, by punching the holes on one diagonal in a relatively different location or of different shape than those on the other diagonal, alternate sheets being reversed in assembling so as to place the holes out of alinement as shown in Figs. 2 and 5 for a purpose hereinafter to be described.

In assembling, the punchings are usually mounted on an arbor or other suitable device for obtaining proper alignment, and when a complete set has been assembled, the end rings 11 are assembled and the whole is compressed and clamped together in a jig. The end rings 11 are provided with holes 12 adapted to register with the holes 10 of the assembled punchings. The holes 12 may be counter-bored for a purpose hereinafter to be described.

After the punchings and end rings have been assembled and clamped, a molten metal, preferably that known as diecast alloy, is poured into the holes 10. This metal 15 will run into and occupy all the cavities and recesses formed by the misalinement or varied shape of the holes 10 in adjacent punchings. The counter-bored portions of the holes 12 are filled up with alloy so as to form a head adapted to hold the end rings 11 securely in place.

A wire or rod 13 may be inserted in the holes 12 before pouring in the molten metal. This rod may be provided with nicks 14 or other means for roughening its surface so as to make it adhere more firmly to the diecast metal. It will be obvious, therefore, that the diecast alloy forms a cast metal insert adapted to securely hold the punchings and end rings in assembled relation, and that the rod 13 forms a reinforcement for said insert, the whole providing a secure and durable means for fastening the punchings and end rings rigidly together.

It will be understood, of course, that any other metal capable of being melted and poured can be used in place of the diecast alloy, and such metal will hereinafter be designated "casting-metal."

Figure 4 illustrates another embodiment of this method of fastening. The recesses 100 of the punchings take the form of notches and the insert 150 takes the form of a metal rod. After assembling and clamping as above described, the rod 150 is welded to the punchings by means of an oxy-acetylene blow pipe or other suitable welding means.

It is obvious that various changes may be made in the details of construction without departing from the spirit of this invention; it is, therefore, to be understood that this invention is not to be limited to the specific construction shown and described.

Having thus described the invention, what is claimed is:

1. In a dynamo-electric machine, a laminated core whose laminæ are provided with irregularly arranged fastener-receiving perforations, a fastener in said perforations, and means for securing each of said laminæ to said fastener.

2. In a dynamo electric machine, a laminated core having the laminæ thereof perforated, and a tension rod lying in said perforations, said perforations being out of alinement, and said laminæ being secured to said rod.

3. In a dynamo electric machine, a laminated core having the laminæ thereof perforated, a rod lying in said perforations, said perforations being out of alinement, and casting metal securing said laminæ to said rod.

In testimony whereof I affix my signature this 19th day of December, 1919.

EDWIN C. BALLMAN.